United States Patent
Sugimoto et al.

(10) Patent No.: US 6,838,510 B2
(45) Date of Patent: Jan. 4, 2005

(54) RESIN COMPOSITION FOR AUTOMOTIVE EXTERIOR PARTS

(75) Inventors: Yoshio Sugimoto, Ichihara (JP); Kazuhiro Doi, Toyota (JP); Tomohiko Akagawa, Izumiotsu (JP); Kaoru Inoue, Toyota (JP); Yuichi Miyake, Toyota (JP)

(73) Assignee: Mitsui Chemicals, Inc., Tokyo (JP)

( * ) Notice: Subject to any disclaimer, the term of this patent is extended or adjusted under 35 U.S.C. 154(b) by 67 days.

(21) Appl. No.: 10/332,368

(22) PCT Filed: May 22, 2002

(86) PCT No.: PCT/JP02/04936

§ 371 (c)(1),
(2), (4) Date: Jan. 7, 2003

(87) PCT Pub. No.: WO02/094933

PCT Pub. Date: Nov. 28, 2002

(65) Prior Publication Data

US 2003/0176554 A1 Sep. 18, 2003

(30) Foreign Application Priority Data

May 24, 2001 (JP) ........................ 2001-155554

(51) Int. Cl.$^7$ ............................. C08K 3/34; C08L 53/00
(52) U.S. Cl. ........................................ 524/451
(58) Field of Search ........................................ 524/451

(56) References Cited

U.S. PATENT DOCUMENTS

| | | | | |
|---|---|---|---|---|
| 5,543,454 A | * | 8/1996 | Kamakura et al. | 524/451 |
| 5,744,535 A | * | 4/1998 | Akagawa et al. | 524/451 |
| 5,750,612 A | * | 5/1998 | Zyagawa et al. | 524/451 |
| 5,837,764 A | * | 11/1998 | Akagawa et al. | 524/451 |
| 5,852,100 A | * | 12/1998 | Sadatoshi et al. | 524/505 |
| 5,883,174 A | * | 3/1999 | Akagawa et al. | 524/451 |
| 6,011,102 A | * | 1/2000 | Shimojo et al. | 524/451 |
| 6,015,857 A | * | 1/2000 | Sobajima et al. | 524/451 |
| 6,156,836 A | * | 12/2000 | Iwanami et al. | 524/451 |
| 6,306,972 B1 | * | 10/2001 | Ohkawa et al. | 525/240 |
| 2002/0058741 A1 | * | 5/2002 | Sakai et al. | 524/451 |

FOREIGN PATENT DOCUMENTS

JP   2000-256531 A   9/2000

OTHER PUBLICATIONS

Derwent translation of JP2000–256531–A (Sep. 19, 2000), Yasuharu et al.*
JPO machine translation of JP2000–309668 (Jul. 11, 2000), Shimojo et al.*

* cited by examiner

*Primary Examiner*—Matthew A. Thexton
(74) *Attorney, Agent, or Firm*—Burns, Doane, Swecker & Mathis, LLP

(57) ABSTRACT

A resin composition for automotive exterior applications, which comprises 50 to 70% by weight of crystalline propylene-ethylene block copolymer, 18 to 25% by weight of elastomeric polymer and 15 to 25% by weight of inorganic filler. The elastomeric polymer is a mixture of a copolymer rubber produced from ethylene and an α-olefin having 6 or more carbon atoms, an ethylene-α-olefin-nonconjugated polyene random copolymer, and a hydrogenated styrene-conjugated diene block copolymer. This resin composition exhibits excellent processibility, and possesses good balance of physical properties including flexural modulus, impact resistance, hardness and brittleness temperature. The moldings fabricated from it gives good appearance free of any remarkable flow mark or weld mark on the surface.

19 Claims, No Drawings

RESIN COMPOSITION FOR AUTOMOTIVE EXTERIOR PARTS

TECHNICAL FIELD OF THE INVENTION

The present invention relates to a resin composition for automotive exterior applications which comprises propylene-ethylene block copolymer, specific elastomeric polymer and inorganic filler. In particular, the present invention relates to a resin composition for automotive exterior applications which renders it possible to fabricate moldings less susceptible to development of flow mark and weld mark.

BACKGROUND OF THE INVENTION

Polypropylene is utilized in wide varieties of industrial fields as molding material for daily necessities, sundry goods, kitchen utensils, wrapping film, automotive parts, machine parts, electric and electronic appliance parts, etc. Polypropylene is put into service after it is compounded with such various additives as will complement its inherent properties to the extent that the properties required of intended molded articles will be fulfilled. For instance, polypropylene compositions containing elastomer, talc, etc. are utilized for applications in which high mechanical strengths are requisite, such as for the automotive part use.

In contrast with those polypropylene compositions available to date whose physical properties are improved by adding elastomer, talc, etc., there have prevailed among the relevant industrial circles keen demands for introduction of such resin that will give, in addition to higher rigidity and high impact resistance, low gloss and high flowability which dispenses with the coating process by virtue of least conspicuous flow mark and weld mark. The use of uncoated part is beneficial from the standpoint of simplifying the automotive parts manufacturing processes.

In the meantime, conventional resin composition for automotive exterior applications such as bumpers becomes flexible and has low flowability due to request high impact resistance. While the industries concerned these days have been pressing for development of larger and/or thinner moldings on top of the aforesaid demand, it is difficult today to satisfy those demands by employing resin compositions comprised of the conventional components.

DESCRIPTION OF THE INVENTION

Accordingly, it is an object of the present invention to provide a resin composition for automotive exterior applications which has good in-process flowability and good balance of physical properties including flexural modulus, impact resistance, hardness and brittleness temperature, and, moreover, does not develop conspicuous flow mark and weld mark.

That is to say, the present invention relates to a resin composition for automotive exterior applications, which comprises
(A) 50 to 70% by weight of a crystalline propylene-ethylene block copolymer (A-1) by itself or a polypropylene mixture comprising of the A-1 and a crystalline propylene homopolymer (A-2) in a weight equal to or less than the A-1, said A-1 and polypropylene mixture being collectively referred to as "Component A",
(B) 18 to 25% by weight of an elastomeric polymer, which may be referred to as "Component B", and
(C) 15 to 25% by weight of an inorganic filler, which may be referred to as "Component C",
wherein the crystalline propylene-ethylene block copolymer (A-1) is comprised of a propylene homopolymer segment and a propylene-ethylene random copolymer segment, and has a melt flow rate of 70 to 130 g/10 min as determined in accordance with ASTM D-1238 at a temperature of 230° C. and under a load of 2,160 g,
wherein the crystalline propylene-ethylene block copolymer (A-1) is that an isotactic pentad ratio (mmmm ratio) of the propylene homopolymer segment is 97% or more as determined by $^{13}$C-NMR and also that the propylene ethylene random copolymer segment amounts to 5 to 20% by weight,
wherein the crystalline propylene homopoloymer (A-2) is that an isotactic pentad ratio (mmmm ratio) is 97% or more as determined by $^{13}$C-NMR and also that an melt flow rate is 100 to 300 g/10 min (ASTM D-1238, 230° C. and 2,160 g load),
wherein the elastomeric polymer (B) is comprised of
(B-1) a copolymer rubber produced by copolymerizing ethylene with an α-olefin having 6 or more carbon atoms, which has a melt flow rate of 0.5 to 10 g/10 min (ASTM D-1238, 230° C. and 2,160 g load), and which may be referred to as "Component B-1",
(B-2) an ethylene-α-olefin-nonconjugated polyene random copolymer, which has a melt flow rate of 1 g/10 min or less (ASTM D-1238, 230° C. and 2,160 g load), and which may be referred to as "Component B-2", and
(B-3) a hydrogenated block copolymer, which may be referred to as "Component B-3",
wherein said hydrogenated block copolymer (B-3) is a hydrogen addition product or adduct of a block copolymer represented by the following formula (1) or (2),

$$X-Y \quad (1)$$

$$X(-Y-X)_n \quad (2)$$

where X is a polymer block of a monovinyl group-substituted aromatic hydrocarbon compound, Y is a polymer block of a conjugated diene compound, and n is an integer of 1 to 5,
while a hyrogenation ratio of the Y part is 90 mole % or more, the X part content is 10 to 25% by weight, and a melt flow rate of the hydrogenated block copolymer (B-3) is 15 g/10 min or less (ASTM D-1238, 190° C. and 2,160 g load).

It is desirable that the crystalline propylene-ethylene block copolymer (A-1) contains an ethylene unit by 1 to 10% by weight.

And, it is preferable that the elastomeric polymer (B) is comprised, in 100% by weight of the resin composition, in the following ratios, respectively,
(B-1) 10 to 20% by weight of the copolymer rubber produced from ethylene and an α-olefin having 6 or more carbon atoms,
(B-2) 1 to 5% by weight of the ethylene-α-olefin-nonconjugated polyene random copolymer, and
(B-3) 1 to 10% by weight of the hydrogenated block copolymer.

Preferred for the copolymer rubber produced from ethylene and an α-olefin having 6 or more carbon atoms (B-1) is a rubbery matter produced by copolymerizing ethylene with an α-olefin having 6 or more carbon atoms using a single-site catalyst. The copolymerization ratio of the α-olefin unit in the copolymer rubber (B-1) is preferably in a range of 10 to 50% by weight. Ethylene-1-octene copolymer can be exemplified as a favorable copolymer rubber (B-1).

The preferred type of the ethylene-α-olefin-nonconjugated polyene random copolymer (B-2) is ethylene-propylene-diene terpolymer or ethylene-1-butene-diene terpolymer.

Preferable the hydrogenated block copolymers (B-3) are styrene-ethylene-butene-styrene block copolymer, styrene-ethylene-propylene-styrene block copolymer, or styrene-ethylene-propylene block copolymer.

And, a talc is preferred for the inorganic filler (C), while particularly preferred is the one which has an average particle size of 2 to 6 μm as determined by a laser light scattering test.

Favorable resin composition is the one which has a melt flow rate of 30 g/10 min or more (ASTMD-1238, 230° C. and 2,160 g load), a flexural modulus of 1,900 MPa or more as determined in accordance with ASTM D-790, and a brittleness temperature of –20° C. or lower as determined in accordance with ASTM D-746. There can be fabricated from such resin composition moldings which hardly reveal any noticeable flow mark or weld mark in appearance.

DESCRIPTION OF THE PREFERRED EMBODIMENTS

Next, detailed explanations are made as follows about the resin composition for automotive exterior applications of the present invention along with its components.

Component (A)

What is employed as Component (A) in the present invention is a crystalline propylene-ethylene block copolymer (A-1) by itself or in the form of a polypropylene mixture comprised of the crystalline propylene-ethylene block copolymer (A-1) and a crystalline propylene homopolymer (A-2) in a weight equal to or less than the A-1.

The crystalline propylene-ethylene block copolymer (A-1) is comprised of a polypropylene homopolymer segment and a propylene-ethylene random copolymer segment.

The type of crystalline propylene-ethylene block copolymer (A-1) to be employed is the one which comprises the propylene-ethylene random copolymer segment by 5 to 20% by weight, and preferably 8 to 13% by weight, and comprises, conversely, the propylene homopolymer segment by 80 to 95% by weight, and preferably 87 to 92% by weight. Hence, the propylene-ethylene random copolymer segment and the propylene homopolymer segment add up to 100% by weight in all.

The amount of propylene-ethylene random copolymer segment contained in the crystalline propylene-ethylene block copolymer (A-1) can be determined on the basis of the actual quantity of a soluble portion of the block copolymer sample into p-xylene solvent which is isolated at room temperature and referred to quantitative analysis. The following is an example of applicable analytical procedure. Namely, a 5 g sample of the block copolymer is thoroughly dissolved in boiling p-xylene, and after the resultant solution has been cooled to 20° C. and left for one whole day and overnight, insolubles are separated by filtration, and thereupon by adding 1,500 ml of methanol to the filtrate and stirring the resulting liquid there are separated p-xylene solubles as deposits, which are then filtered out and dried into solids to be finally weighed. The p-xylene solubles can be thus determined.

The propylene homopolymer segment contained in the crystalline propylene-ethylene block copolymer (A-1) has an isotactic pentad ratio (mmmm ratio) of 97% or more, and preferably 97.5% or more as determined by carbon-13 nuclear magnetic resonance spectroscopy ($^{13}$C-NMR).

The isotactic pentad ratio (mmmm ratio) as employed in the present invention indicates a ratio of an isotactic chain in a crystalline polypropylene molecular chain in terms of a pentad unit as determined by $^{13}$C-NMR. Specifically, it is a value calculated as a ratio of [an absorption peak in $^{13}$C-NMR spectrum of the propylene monomer unit located in the center of meso-linkage in which five propylene monomer units are linked in series] to [the total absorption peaks of the carbon in methyl group].

It is desirable that the crystalline propylene-ethylene block copolymer (A-1) to be employed contains ethylene units by preferably 1 to 10% by weight, and more preferably 3 to 8% by weight.

The ethylene unit content can be determined by means of subjecting compression-molded films prepared from the crystalline propylene-ethylene block copolymer (A-1) to an infrared absorption spectroscopy. That is to say, an absorbance at 1,155 cm$^{-1}$ of methyl group and an absorbance of methylene group are to be determined, respectively, in reference with Gardner calibration curves (I. J. Gardner et al., Rubber Chem. and Tech., 44, 1015, 1971).

To be employed as the crystalline propylene-ethylene block copolymer (A-1) is the one which has a melt flow rate (MFR) of 70 to 130 g/10 min, and preferably 80 to 120 g/10 min in accordance with ASTM D-1238 at a temperature of 230° C. and under a load of 2,160 g. In cases where the block copolymer having the MFR less than said ranges is employed, moldings fabricated from the resultant resin composition tend to develop flow mark and weld mark on the surfaces, and their shrinkage on heating increases, and hence such block copolymer is not desirable to use. The crystalline propylene-ethylene block copolymer (A-1) may be employed singly or in a combination of two or more types.

In general terms, polymer does not exist as a cluster of identical molecules having an identical molecular weight, but assumes the form of the cluster of molecules having various molecular weights to constitute an entirety possessing certain overall properties. The crystalline propylene-ethylene block copolymer (A-1) employed in the present invention, too, represents the cluster of various molecules having different molecular weights. As a whole, this block copolymer is comprised of said specific propylene homopolymer segment and said propylene-ethylene random copolymer segment and exhibits the melt flow ratio value falling within specific ranges.

It is furthermore preferable for the present invention to employ the block copolymer whose propylene homopolymer segment and propylene-ethylene random copolymer segment has the following molecular weights and compositions.

To be employed as the crystalline propylene-ethylene block copolymer (A-1) is the one, whose propylene homopolymer segment has a melt flow rate (ASTM D-1238, 230° C. and 2,160 g load) of preferably 100 to 300 g/10 min, and particularly preferably 120 to 250 g/10 min. As for the propylene-ethylene random copolymer segment, it is preferable that it has an intrinsic viscosity [η] of 6 to 9 dl/g as determined in decahydronaphthalene at a temperature of 135° C. and an ethylene unit content of 20 to 40% by weight, and particularly 24 to 32% by weight.

According to the present invention, there may be employed a polypropylene mixture of the crystalline propylene-ethylene block copolymer (A-1) and the crystalline propylene homopolymer (A-2) in a weight equal to or less than the A-1 instead of employing the A-1 singly.

It is desirable that the crystalline propylene homopolymer (A-2) has an isotactic pentad ratio (mmmm ratio) of 97% or more, and preferably 97.5% or more, a melt flow rate of 100 to 300 g/10 min, and preferably 120 to 250 g/10 min (ASTM D-1238, 230° C. and 2,160 g load).

While the crystalline propylene-ethylene block copolymer (A-1) can be manufactured by varieties of processes, it can be manufactured by employing some well-known stereoregular olefin polymerization catalyst, for example, Ziegler-Natta catalyst or a metallocene catalyst. As one example of such process for manufacturing the block copolymer (A-1) using Ziegler-Natta catalyst, there can be cited the process for polymerizing propylene and successively copolymerizing propylene with ethylene in the presence of a catalyst formulated with, for example, a solid titanium catalyst component, an organometallic compound catalyst component, and, insofar as necessary, an electron donor. The crystalline propylene homopolymer (A-2) which is one of the components constituting the polypropylene mixture, too, can be manufactured by employing the aforesaid similar type of stereoregular olefin polymerization catalyst.

Component (B)

The elastomeric polymer (B) employed in the present invention is comprised of the following three types of copolymer. Namely, a copolymer rubber produced from ethylene and an α-olefin having 6 or more carbon atoms (B-1), an ethylene-α-olefin-nonconjugated polyene random copolymer (B-2), and a hydrogenated block copolymer (B-3).

The copolymer rubber produced from ethylene and an α-olefin having 6 or more carbon atoms (B-1) is a rubbery material produced by copolymerizing ethylene with an α-olefin having 6 or more carbon atoms, and preferably 6 to 12 carbon atoms. As examples of this α-olefin, there can be cited 1-hexene, 4-methyl-1-pentene, 1-octene, 1-decene, and 1-dodecene.

Employed as the copolymer rubber produced from ethylene and the α-olefin having 6 or more carbon atoms (B-1) is the one which has a melt flow rate (MFR) of 0.5 to 10 g/10 min, and preferably 1 to 8 g/10 min (ASTM D-1238, 230° C. and 2,160 g load). In cases where the copolymer rubber employed has the MFR exceeding said ranges, moldings fabricated from the resultant resin composition give only inferior rigidity and diminished low-temperature impact resistance, and hence such use is not desirable. It is desirable that the employed copolymer rubber has a weight ratio of [ethylene] to [α-olefin having 6 or more carbon atoms] of 90/10 to 50/50, and preferably 80/20 to 60/40. Cited as the favorable B-1 copolymer rubber is ethylene-1-octene copolymer rubber.

Such ethylene-α-olefin copolymer rubber (B-1) can be manufactured by copolymerizing ethylene with the α-olefin having 6 or more carbon atoms using a stereoregular olefin polymerization catalyst. The ethylene-α-olefin copolymer which is manufactured using a single site polymerization catalyst, in particular, demonstrates excellent effect of enhancing the low temperature impact strength when fabricated into moldings owing to its relatively narrow molecular weight distribution and component distribution. There can be cited a metallocene catalyst containing a metallocene compound having a compound of the cyclopentadine skeleton coordinated to a transition metal such as zirconium and an organoaluminum-oxy compound, etc. as an example of such single site catalyst.

Ethylene-α-olefin-nonconjugated polyene random copolymer (B-2) is a random terpolymer rubber produced from ethylene, an α-olefin, and a nonconjugated polyene compound. What can be employed as such α-olefin is the one which has typically 3 to 20 carbon atoms, and preferably 3 to 10 carbon atoms. As specific examples of such α-olefin, there can be cited propylene, 1-butene, 1-pentene, 1-hexene, 1-octene, 1-decene, 4-methyl-1-pentene, etc.

Examples of the nonconjugated polyene compound are cyclic nonconjugated diene compounds such as 5-ethylidene-2-norbornene, 5-propylidene-2-norbornene, dicyclopentadiene, 5-vinyl-2-norbornene, 5-methylene-2-norbornene, 5-isopropylidene-2-norbornene, norbornadiene, etc.; aliphatic nonconjugated diene compounds such as 1,4-hexadiene, 4-methyl-1,4-hexadiene, 5-methyl-1,4-hexadiene, 5-methyl-1,5-heptadiene, 6-methyl-1,5-heptadiene, 6-methyl-1,7-octadiene, 7-methyl-1,6-octadiene, etc.; and triene compounds such as 2,3-diisopropylidene-5-norbornene, etc. Among the aforesaid compounds, 1,4-hexadiene, dicyclopentadiene, 5-ethylidene-2-norbornene are favorably employed.

Employed in the present invention as the ethylene-α-olefin-nonconjugated polyene random copolymer (B-2) is the one which has a melt flow rate (MFR) of 1 g/10 min or less, and preferably 0.1 to 0.5 g/10 min (ASTM D-1238, 230° C. and 2,160 g load). In cases where the copolymer having the MFR exceeding said ranges is employed, moldings fabricated from the resultant resin compositions tend to develop flow mark and weld mark on the surfaces of moldings, and hence such copolymers are not desirable to use.

It is desirable that the ratio of copolymerization of ethylene to α-olefin in the ethylene-α-olefin-nonconjugated polyene random copolymer(B-2) is preferably 90/10 to 40/60, and more preferably 85/15 to 50/50 in terms of the ethylene-to-α-olefin mole ratio. And, an amount of the nonconjugated polyene compound in the random copolymer (B-2) is preferably in a range of 1 to 40, and more preferably in a range of 2 to 35 in terms of an iodine value of the random copolymer.

There can be cited ethylene-propylene-diene terpolymer (EPDM) and ethylene-1-butene-diene terpolymer as representative examples of such ethylene-α-olefin-nonconjugated polyene random copolymer (B-2).

The hydrogenated block copolymer (B-3) is a hydrogen adduct of a block copolymer that is represented by the following formula (1) or (2).

wherein X is a polymer block of a monovinyl group-substituted aromatic hydrocarbon compound, Y is a polymer block of a conjugated diene compound, and n is an integer of 1 to 5.

Cited as examples of the monovinyl group-substituted aromatic hydrocarbon compound constituting the polymer block indicated by X in the above formula are styrene or its derivatives such as α-methylstyrene, p-methylstyrene, chlorostyrene, lower alkyl group-subsituted styrene, vinyl naphthalene, etc. These monovinyl group-substituted aromatic hydrocarbon compounds may be employed either singly or in a combination of two or more types. Particularly preferred among them is styrene.

Cited as examples of the conjugated diene compound constituting the polymer block indicated by Y are butadiene, isoprene, chloroprene, etc. They may be employed either singly or in a combination of two or more types. Particularly preferred among them is butadiene or isoprene. In the case butadiene is employed as the conjugated diene compound, it is desirable that a ratio of the 1,2-linkage in the polybutadiene block is preferably 20 to 80% by weight, and more preferably 30 to 60% by weight.

In the block copolymer indicated in the formula (2), n is to be an integer of 1 to 5, and preferably 1 or 2.

In this block copolymer, a ratio of hydrogenation of the conjugated diene polymer block is to be 90 mole % or more, and preferably 95 mole % or more. And, the block copolymer contains X part by 10 to 25% by weight and has a melt flow rate of 15 g/10 min or less, and preferably 1 to 10 g/10 min (ASTM D-1238, 190° C. and 2,160 g load). In cases where the block copolymer contains the X part in excess of said range, the moldings fabricated from the resultant resin composition come to have increased shrinkage on heating and get low temperature brittleness impaired, and hence the use of such block copolymer is not desirable.

Cited as specific examples of the hydrogenated block copolymer (B-3) are styrene-based block copolymers such as styrene-ethylene-butene-styrene block copolymer (SEBS) produced by hydrogenating styrene-butadiene-styrene tri-block copolymer; styrene-ethylene-propylene-styrene block copolymer (SEPS) produced by hydrogenating styrene-isoprene-styrene tri-block copolymer; and styrene-ethylene-propylene block copolymer (SEP) produced by hydrogenating styrene-isoprene di-block copolymer.

The block copolymer in the pre-hydrogenation stage can be manufactured by executing block copolymerization of the respective monomer components in the presence of lithium catalyst or Ziegler catalyst in an inert solvent. Details of such manufacturing processes are described in pertinent publications, such as Japanese Patent Publication No. 23798/1965. The hydrogenation treatment can be executed for said block copolymer in an inert solvent in the presence of a well-known hydrogenation catalyst. Details of such hydrogenation method are described in, for example, Japanese Patent Publication No. 8704/1967, Japanese Patent Publication No. 6636/1968, and Japanese Patent Publication No. 20814/1971, respectively.

The aforesaid hydrogenated block copolymer (B-3) is commercially available under such trade names as Kraton (trade name) G1657 (supplied by Shell Chemical Int. Trading Comp.), Septon (trade name) 2004 (supplied by Kuraray Co.) and Tuftek (trade name) H1052 and 1062 (supplied by Asahi Chemicals Industry Co., Ltd.). Any one of those products is useable for the present invention.

Each of the copolymer rubber produced from ethylene and the α-olefin having 6 or more carbon atoms (B-1), the ethylene-α-olefin-nonconjugated polyene random copolymer (B-2) and the hydrogenated block copolymer (B-3), which are the components of the elastomeric polymer (B), may be employed either singly or in a combination of two or more types, as have been explained in the foregoing.

Component (C)

What can be cited as examples of an inorganic filler (C) in the present invention are talc, clay, calcium carbonate, mica, silicates, carbonates, glass fiber, etc. Particularly preferred among them is talc. As for talc, it is desirable to employ a grade having an average particle size of preferably 1 to 10 μm, and more preferably 2 to 6 μm as determined by a laser light scattering test. The aforesaid inorganic filler can be employed either singly or in a combination of two or more types.

Resin Composition

The resin composition for automotive exterior applications of the present invention is comprised of the following ingredients which are contained in the stated ratios. Namely, (A) 50 to 70% by weight, and preferably 55 to 65% by weight of either the crystalline propylene-ethylene block copolymer (A-1) by itself or in the form of the polypropylene mixture comprised of the A-1 and the crystalline propylene homopolymer (A-2), the latter of which being contained in a weight equal to or less than the A-1, (B) 18 to 25%, and preferably 19 to 24% by weight of the elastomeric polymer, and (C) 15 to 25% by weight, and preferably 18 to 23% by weight of the inorganic filler, wherein the sum of said three components, i.e. (A), (B), and (C), is 100% by weight.

It is desirable that the elastomeric polymer (B) comprises the following components in the stated ratios insofar as the contents remain within said range. Namely, (B-1) 10 to 20% by weight, and preferably 13 to 19% by weight of the copolymer rubber produced from ethylene and the α-olefin having 6 or more carbon atoms, (B-2) 1 to 5% by weight, and preferably 2 to 5% by weight of the ethylene-α-olefin-nonconjugated polyene random copolymer, and (B-3) 1 to 10% by weight and preferably 3 to 8% by weight of the hydrogenated block copolymer.

In addition to the aforesaid components (A), (B), and (C), there may be compounded with said resin composition, if necessary, other additives, insofar as required to the extent not deviating from the object of the present invention. For example, heat stabilizer, antistatic agent, weathering stabilizer, light stabilizer, age resistor, antioxidant, ultraviolet absorbing agent, softening agent, dispersant, coloring agent such as pigment, lubricant, etc.

The resin composition of the present invention is obtained by admixing or melt kneading the aforesaid components (A) through (C), and such additives that are added if necessary in a mixing equipment such as Banbury mixer, single screw extruder, twin screw extruder, and high-speed twin screw extruder. The sequence of mixing for the respective components, i. e., (A-1), (A-2), (B-1), (B-2), (B-3) and (C), and also such additives that are employed if necessary is settled optionally, and they may be admixed at once or there may be adopted a multi-step mixing procedure, such as by admixing some components preliminarily and then the other components are admixed together with the pre-mixed portion.

The resin composition of the present invention prepared according to the aforesaid procedure exhibits good in-process flowability, and the moldings fabricated from the resin composition, moreover, possesses good balance of physical properties such as flexural modulus, impact resistance, hardness and brittleness temperature. For instance, the resin composition that exhibits the following properties may be obtained, (1) a melt flow rate (MFR) of preferably 30 g/10 min or more, and more preferably 35 to 60 g/10 min as determined in accordance with ASTM D-1238 at a temperature of 230° C. and under a load of 2,160 g, (2) a flexural modulus of preferably 1,900 MPa or more as determined in accordance with ASTM D-790, and (3) a brittleness temperature of −20° C. or lower, and more preferably −25° C. or lower as determined in accordance with ASTM D-746.

Besides, the resin composition of the present invention gives a low shrinkage on heating.

The resin composition of the present invention that possesses the aforesaid resin properties can be favorably utilized as injection molding resin. In the actual injection molding application, this resin composition demonstrates very good flowability, and molded articles having good dimensional stability can be readily fabricated.

The resin composition of the present invention can be put into service in fabrication of automotive parts, particularly automotive exterior applications, such as bumper, overfender, side body molding, rocker molding, etc.

EXAMPLES

The present invention is further described with reference to examples, but it should be construed that the invention is in no way limited by those examples.

The components employed in preparing the respective resin composition cited in Examples and Comparative Examples each had the following properties.
(1) Propylene-ethylene Block Copolymer (PEBC-1)
Melt flow rate (MFR) (230° C., 2,160 g load):
  100 g/10 min
Propylene homopolymer segment: 90% by weight isotactic pentad ratio (mmmm ratio): 98%
Propylene-ethylene random copolymer segment:
  10% by weight
  intrinsic viscosity [η]: 7.5 dl/g
  (measured at 135° C. in decahydronaphthalene solvent)
  ethylene content: 26% by weight
(2) Propylene-ethylene Block Copolymer (PEBC-2)
Melt flow rate (MFR) (230° C., 2,160 g load):
  60 g/10 min
Propylene homopolymer segment: 90% by weight
  isotactic pentad ratio (mmmm ratio): 98%
Propylene-ethylene random copolymer segment:
  10% by weight
  intrinsic viscosity [η]: 7.5 dl/g
  (measured at 135° C. in decahydronaphthalene solvent)
  ethylene content: 26% by weight
(3) Propylene Homopolymer (PP)
Melt flow rate (MFR) (230° C., 2,160 g load):
  230 g/10 min
Isotactic pentad ratio (mmmm ratio): 98%
(4) Ethylene-1-octene Random Copolymer Rubber (EOR-1)
Polymer produced using metallocene catalyst
1-Octene content: 27% by weight
Melt flow rate (MFR) (230° C., 2,160 g load): 4 g/10 min
(5) Ethylene-1-octene Random Copolymer Rubber (EOR-2)
Melt flow rate (MFR) (230° C., 2,160 g load): 25 g/10 min
1-Octene content: 24% by weight
(6) Ethylene-propylene-5-ethylidene-2-norbornene terpolymer (EPT-1)
Melt flow rate (MFR) (190° C., 2,160 g load):
  0.2 g/10 min
Propylene content: 28% by weight
Iodine value: 15
(7) Ethylene-propylene-5-ethylidene-2-norbornene Terpolymer (EPT-2)
Melt flow rate (MFR) (190° C., 2,160 g load):
  5 g/10 min
Propylene content: 28% by weight
Iodine value: 15
(8) Styrene-ethylene-butene-styrene Block Copolymer (SEBS-1)
Melt flow rate (MFR) (190° C., 2,160 g load): 4 g/10 min
Styrene content: 20% by weight
(9) Styrene-ethylene-butene-styrene Block Copolymer (SEBS-2)
Melt flow rate (MFR) (190° C., 2,160 g load):
  5.0 g/10 min
Styrene content: 30% by weight
(10) Talc Fine Powder
Average particle size: 4 μm Physical properties of the resin compositions and moldings that had been obtained in Examples and Comparative Examples were determined in accordance with the following test methods.

(1) Melt flow rate (MFR): ASTM D-1238 at a temperature of 230° C. and under a load of 2,160 g
(2) Flexural modulus: ASTM D-790
(3) Brittleness temperature: ASTM D-746
(4) Shrinkage on heating:

Flat sheets of 150 mm length, 150 mm width and 2 mm thickness were formed by injection molding under the operating conditions of a resin temperature of 230° C. and a mold temperature of 40° C. The length and width of each sheet were measured after it had been left to stand for 72 hr at room temperature. The average values were reported as initial dimensions. Next, the sheets were heated for 30 min in a heating oven maintained at a temperature of 120° C. After the sheet was left to stand at room temperature for 24 hr, its dimensions were measured after such heat history. The shrinkage on heating (%) was calculated according to the following formula.

$$\{(\text{Initial dimensions} - \text{Dimensions after heating})/(\text{Initial dimensions})\} \times 100$$

(5) Spiral flow length:

The resin composition was injection molded at a resin temperature of 230° C. using a mold for resin flowability test which had a spiral channel of 3 mm thickness, 10 mm width and 2,000 mm length. The obtained molding was measured with respect to its flow length (mm), the value of which was reported as its spiral flow length.

(6) Flow mark development ratio:

The molding specimen which was injection-molded for measuring the spiral flow length according to the aforesaid method was inspected for measuring the length of resin flow at the point where a flow mark began to develop. The ratio of [the resin flow length at the point where the flow mark started] to [the total resin flow length] was reported as the flow mark development ratio (%).

(7) Weld mark development length:

In molding the flat sheet of 350 mm length, 135 mm width and 3 mm thickness, there was employed a mold provided with a gate on the longitudinal plane at a 70 mm distance from the transverse plane. A baffle pillar of 20 mm length, 20 mm width and 3 mm height was provided 50 mm downstream of the gate for the purpose of retarding the resin flow. The length of the weld mark which had developed on the surface of the specimen sheet injection-molded using said mold was evaluated by visual inspection on the basis of the length of the weld mark created downstream of the baffle pillar as far down to the tail end where the weld mark faded away.

Example 1

A resin composition was produced by admixing specified quantities of the components as described in Table 1 in a Henschel mixer and then pelletizing the resultant mixture in a twin-screw extruder.

The obtained resin composition had a melt flow rate (MFR) (230° C., 2,160 g load) of 40 g/10 min.

This resin composition was evaluated with respect to various physical properties. The test specimens referred to those tests had been prepared by injection molding using a J100SAII-model injection molding machine manufactured by Japan Steel Works, Ltd. which was operated at a cylinder temperature of 230° C. and a mold temperature of 40° C.

Results of the physical property tests are shown in Table 1. As can be clearly seen from the data in Table 1, the resin composition had high melt flowability, and excellent processibility, and there was no indication of remarkable tendency toward development of flow mark and weld mark. Besides, the resin composition exhibited a low shrinkage on heating, high rigidity, and sufficiently low brittleness temperature.

Example 2

A resin composition was produced by the same procedure as in Example 1 except that the amount of propylene-ethylene block copolymer (PEBC-1) to be added was changed from 59 parts by weight to 40 parts by weight and the amount of ethylene-1-octene random copolymer rubber (EOR-1) to be added was changed from 13 parts by weight to 15 parts by weight and that 17 parts by weight of propylene homopolymer (PP) was added.

The resultant resin composition was evaluated with respect to its physical properties. Results of the physical property tests are shown in Table 1. As can be seen from the data in Table 1, this resin composition, too, was found to have good melt flowability and processibility, and there was no indication of remarkable tendency toward development of flow mark and weld mark. Besides, the resin composition exhibited a low shrinkage on heating, high rigidity and sufficiently low brittleness temperature.

Comparative Example 1

The same procedure as in Example 1 was followed except that the amount of ethylene-1-octene random copolymer rubber (EOR-1) was increased to 18 parts by weight to make up for omission of styrene-ethylene-butene-styrene block copolymer (SEBS-1). The resultant resin composition was evaluated with respect to its physical properties. Results of the physical property tests are shown in Table 1. The obtained resin composition exhibited a high brittleness temperature and inferior low-temperature impact resistance.

Comparative Example 2

The same procedure as in Example 1 was followed except that the amount of styrene-ethylene-butene-styrene block copolymer (SEBS) was increased to 18 parts by weight to make up for omission of ethylene-1-octene random copolymer rubber (EOR-1). The resultant resin composition was evaluated with respect to its physical properties. Results of the physical property tests are shown in Table 1. The obtained resin composition exhibited a large shrinkage on heating and inferior dimensional stability.

Comparative Example 3

The same procedure as in Example 1 was followed except that the amount of ethylene-1-octene random copolymer rubber (EOR-1) was increased to 16 parts by weight to make up for omission of ethylene-propylene-5-ethylidene-2-norbornene terpolymer (EPT-1). The resultant resin composition was evaluated with respect to its physical properties. Results of the physical property tests are shown in Table 1. The obtained resin composition was apt to develop flow mark and weld mark, and was found unsatisfactory for use as a molding resin for large thin-walled moldings fabrication.

Comparative Example 4

The same procedure as in Example 1 was followed except that ethylene-propylene-5-ethylidene-2-norbornene terpolymer (EPT-2) was employed in place of the ethylene-propylene-5-ethylidene-2-norbornene terpolymer (EPT-1). The resultant resin composition was evaluated with respect to its physical properties. Results of the physical property tests are shown in Table 1. The obtained resin composition was apt to develop flow mark and weld mark, as was the case with the resin composition obtained in Comparative Example 3.

Comparative Example 5

The same procedure as in Example 1 was followed except that propylene-ethylene block copolymer (PEBC-2) was employed in place of the propylene-ethylene block copolymer (PEBC-1).

The resultant resin composition was evaluated with respect to its physical properties. Results of the physical property tests are shown in Table 1. The obtained resin composition was found to have somewhat insufficient melt flowability and inferior processibility, and was apt to develop flow mark and weld mark. Besides, its shrinkage on heating was large.

Comparative Example 6

The same procedure as in Example 1 was followed except that styrene-ethylene-butene-styrene tri-block copolymer (SEBS-2) was employed in place of the styrene-ethylene-butene-styrene block copolymer (SEBS-1).

The resultant resin composition was evaluated with respect to its physical properties. Results of the physical property tests are shown in Table 1. The obtained resin composition exhibited a large shrinkage on heating and insufficient brittleness temperature.

Comparative Example 7

The same procedure as in Example 1 was followed except that ethylene-1-octene random copolymer rubber (EOR-2) was employed in place of ethylene-1-octene random copolymer rubber (EOR-1).

The resultant resin composition was evaluated with respect to its physical properties. Results of the physical property tests are shown in Table 1. The obtained resin composition was found to have low rigidity and not sufficiently low enough brittleness temperature.

Comparative Example 8

The same procedure as in Example 1 was followed except that the amount of talc was decreased from 20 parts by weight to 10 parts by weight and, on the other hand, the amount of propylene-ethylene block copolymer (PEBC-1) to be added was increased from 59 parts by weight to 69 parts by weight.

The resultant resin composition was evaluated with respect to its physical properties. Results of the physical properties tests are shown in Table 1. The obtained resin composition was found to have too low rigidity and a large shrinkage on heating.

TABLE 1

| | Example 1 | Example 2 | Compara. Example 1 | Compara. Example 2 | Compara. Example 3 | Compara. Example 4 | Compara. Example 5 | Compara. Example 6 | Compara. Example 7 | Compara. Example 8 |
|---|---|---|---|---|---|---|---|---|---|---|
| Resin Composition (Parts by Weight) | | | | | | | | | | |
| PEBC-1 | 59 | 40 | 59 | 59 | 59 | 59 | — | 59 | 59 | 69 |
| PEBC-2 | — | — | — | — | — | — | 59 | — | — | — |
| PP | — | 17 | — | — | — | — | — | — | — | — |
| EOR-1 | 13 | 15 | 18 | — | 16 | 13 | 13 | 13 | — | 13 |
| EOR-2 | — | — | — | — | — | — | — | — | 13 | — |
| EPT-1 | 3 | 3 | 3 | 3 | — | — | 3 | 3 | 3 | 3 |
| EPT-2 | — | — | — | — | — | 3 | — | — | — | — |
| SEBS-1 | 5 | 5 | — | 18 | 5 | 5 | 5 | — | 5 | 5 |
| SEBS-2 | — | — | — | — | — | — | — | 5 | — | — |
| TALC | 20 | 20 | 20 | 20 | 20 | 20 | 20 | 20 | 20 | 10 |
| Physical Properties of Resin Composition | | | | | | | | | | |
| MFR (g/10 min) | 40 | 42 | 44 | 39 | 41 | 42 | 32 | 43 | 47 | 48 |
| Flexural Modulus (MPa) | 1980 | 2042 | 2015 | 1927 | 1913 | 1954 | 1948 | 2016 | 1870 | 1627 |
| Brittleness Temperature (° C.) | −30 | −28 | −7 | −36 | −33 | −31 | −37 | −17 | −15 | −43 |
| Shrinkage on Heating (%) | 1.7 | 1.8 | 1.4 | 3.4 | 1.7 | 1.8 | 2.8 | 2.8 | 1.6 | 3.6 |
| Spiral Flow Length (mm) | 144 | 143 | 150 | 139 | 144 | 147 | 123 | 149 | 152 | 153 |
| Flow Mark Develop. Ratio (%) | 24 | 26 | 23 | 30 | 36 | 34 | 34 | 25 | 25 | 21 |
| Weld Mark Develop. Length (mm) | 5.7 | 5.5 | 5.2 | 5.6 | 8.4 | 7.9 | 6.2 | 5.3 | 5.1 | 4.3 |

INDUSTRIAL APPLICABILITY

The resin composition for automotive exterior applications of the present invention gives good in-process flowability and excellent balance of physical properties including flexural modulus, hardness and brittleness temperature by virtue of the presence of specific quantities of specific crystalline propylene-ethylene block copolymer, specific elastomeric polymer and inorganic filler. Such flow mark and weld mark that usually appear on the surface of the injection molded articles are hardly recognizable in case this resin composition is employed.

Hence, the resin composition of the present invention fabricated into automotive exterior parts can be put in service as it is, without being provided with any surface coating process, since it imparts to the moldings good appearance as well as sufficient mechanical strengths.

What we claim is:

1. A resin composition for automotive exterior application, which comprises
   (A) 50 to 70% by weight of a crystalline propylene-ethylene block copolymer (A-1) by itself or a polypropylene mixture comprising of the A-1 and a crystalline propylene homopolymer (A-2) in a weight equal to or less than the A-1,
   (B) 18 to 25% by weight of an elastomeric polymer, and
   (C) 15 to 25% by weight of an inorganic filler,
   wherein the crystalline propylene-ethylene block copolymer (A-1) is comprised of a propylene homopolymer segment and a propylene-ethylene random copolymer segment, and has a melt flow rate of 70 to 130 g/10 min as determined in accordance with ASTM D-1238 at a temperature of 230° C. and under a load of 2,160 g,
   wherein the crystalline propylene-ethylene block copolymer (A-1) has an isotactic pentad ratio (mmmm ratio) of the propylene homopolymer segment of 97% or more as determined by $^{13}$C-NMR and the propylene ethylene random copolymer segment amounts to 5 to 20% by weight,
   wherein the crystalline propylene homopolymer (A-2) has an isotactic pentad ratio (mmmm ratio) of 97% or more as determined by $^{13}$C-NMR, and a melt flow rate of 100 to 300 g/10 min (ASTM D-1238, 230° C. and 2,160 g load), wherein the elastomeric polymer (B) is comprised of (B-1) a copolymer rubber produced by copolymerizing ethylene with an α-olefin having 6 or more carbon atoms, which has a melt flow rate (MFR) of 0.5 to 10 g/10 mm (ASTM D-1238, 230° C. and 2,160 g load),
   (B-2) an ethylene-α-olefin-nonconjugated polyene random copolymer, which has a melt flow rate of 1 g/10 min or less (ASTM D-1238, 230° C. and 2,160 g load), and
   (B-3) a hydrogenated block copolymer,
   wherein the hydrogenated block copolymer (B-3) is a hydrogen adduct of a block copolymer represented by the following formula (1) or (2),

$$X-Y \quad (1)$$

$$X(-Y-X)_n \quad (2)$$

where X is a polymer block of a monovinyl group-substituted aromatic hydrocarbon compound, Y is a polymer block of a conjugated diene compound, and n is an integer of 1 to 5,
   while a hydrogenation ratio of the Y part is 90 mole % or more, the X part content is 10 to 25% by weight, and a melt flow rate of the hydrogenated block copolymer (B-3) is 15 g/10 min or less (ASTM D-1238, 190° C. and 2,160 g load).

2. A resin composition for automotive exterior applications according to claim 1, wherein the elastomeric polymer (B) is comprised of (B-1) 10 to 20% by weight of the copolymer rubber produced from ethylene and an α-olefin having 6 or more carbon atoms,
   (B-2) 1 to 5% by weight of the ethylene-α-olefin-nonconjugated polyene random copolymer, and (B-3) 1 to 10% by weight of the hydrogenated block copolymer in 100% by weight of the resin composition.

3. A resin composition for automotive exterior applications according to claim 2, wherein the copolymer rubber produced from ethylene and an α-olefin having 6 or more carbon atoms (B-1) is a rubbery matter manufactured by copolymerizing ethylene with the α-olefin having 6 or more carbon atoms using a single-site catalyst.

4. A resin composition for automotive exterior applications according to claim 3, wherein the copolymer rubber produced from ethylene and an α-olefin having 6 or more carbon atoms (B-1) has 10 to 50% by weight of the α-olefin.

5. A resin composition for automotive exterior applications according to claim 4, wherein the copolymer rubber produced from ethylene and an α-olefin having 6 or more carbon atoms (B-1) is ethylene-1-octene copolymer rubber.

6. A resin composition for automotive exterior applications according to claim 5, wherein the ethylene-α-olefin-nonconjugated polyene random copolymer (B-2) is ethylene-propylene-diene terpolymer or ethylene-1-butene-diene terpolymer.

7. A resin composition for automotive exterior applications according to claim 6, wherein the hydrogenated block copolymer (B-3) is styrene-ethylene-butene-styrene block copolymer, styrene-ethylene-propylene-styrene block copolymer or styrene-ethylene-propylene block copolymer.

8. A resin composition for automotive exterior applications according to claim 7, wherein the inorganic filler (C) is a talc.

9. A resin composition for automotive exterior applications according to claim 8, wherein the talc has an average particle size of 2 to 6 μm as determined by a laser light scattering test.

10. A resin composition for automotive exterior applications according to claim 9, wherein the resin composition has a melt flow rate of 30 g/10 min or more (ASTM D-1238, 230° C. and 2,160 g load), a flexural modulus of 1,900 MPa or more as determined in accordance with ASTM D-790, and a brittleness temperature of −20° C. or lower as determined in accordance with ASTM D-746.

11. A resin composition for automotive exterior applications according to claim 1, wherein the copolymer rubber produced from ethylene and an α-olefin having 6 or more carbon atoms (B-1) is a rubbery matter manufactured by copolymerizing ethylene with the α-olefin having 6 or more carbon atoms using a single-site catalyst.

12. A resin composition for automotive exterior applications according to claim 1, wherein the copolymer rubber produced from ethylene and an α-olefin having 6 or more carbon atoms (B-1) has 10 to 50% by weight of the α-olefin.

13. A resin composition for automotive exterior applications according to claim 1, wherein the copolymer rubber produced from ethylene and an α-olefin having 6 or more carbon atoms (B-1) is ethylene-1-octene copolymer rubber.

14. A resin composition for automotive exterior applications according to claim 1, wherein the ethylene-α-olefin-nonconjugated polyene random copolymer (B-2) is ethylene-propylene-diene terpolymer or ethylene-1-butene-diene terpolymer.

15. A resin composition for automotive exterior applications according to claim 1, wherein the hydrogenated block copolymer (B-3) is styrene-ethylene-butene-styrene block copolymer, styrene-ethylene-propylene-styrene block copolymer or styrene-ethylene-propylene block copolymer.

16. A resin composition for automotive exterior applications according to claim 1, wherein the inorganic filler (C) is a talc.

17. A resin composition for automotive exterior applications according to claim 16, wherein the talc has an average particle size of 2 to 6 μm as determined by a laser light scattering test.

18. A resin composition for automotive exterior applications according to claim 8, wherein the resin composition has a melt flow rate of 30 g/10 min or more (ASTM D-1238, 230° C. and 2,160 g load), a flexural modulus of 1,900 MPa or more as determined in accordance with ASTM D-790, and a brittleness temperature of −20° C. or lower as determined in accordance with ASTM D-746.

19. A resin composition for automotive exterior applications according to claim 1, wherein the resin composition has a melt flow rate of 30 g/10 min or more (ASTM D-1238, 230° C. and 2,160 g load), a flexural modulus of 1,900 MPa or more as determined in accordance with ASTM D-790, and a brittleness temperature of −20° C. or lower as determined in accordance with ASTM D-746.

* * * * *